United States Patent
Sibers et al.

(10) Patent No.: US 7,844,279 B2
(45) Date of Patent: Nov. 30, 2010

(54) METHOD FOR MEASURING RADIO CHANNEL QUALITY AND RELATED EQUIPMENT

(75) Inventors: Jean-Philippe Sibers, Paris (FR); Stéphane De Marchi, Paris (FR)

(73) Assignee: Dibcom, Palaiseau (FR)

( * ) Notice: Subject to any disclaimer, the term of this patent is extended or adjusted under 35 U.S.C. 154(b) by 795 days.

(21) Appl. No.: 11/878,791

(22) Filed: Jul. 26, 2007

(65) Prior Publication Data
US 2008/0032700 A1 Feb. 7, 2008

(30) Foreign Application Priority Data
Aug. 4, 2006 (EP) .................................. 06291271

(51) Int. Cl.
*H04W 72/00* (2009.01)
(52) U.S. Cl. .............. 455/452.2; 455/67.11; 455/67.13; 455/423; 370/332; 375/224; 375/228; 375/240.27; 375/243; 375/359; 375/362; 375/365; 375/366; 375/367; 375/368
(58) Field of Classification Search .............. 455/452.2, 455/67.11, 67.13, 423; 370/332
See application file for complete search history.

(56) References Cited

FOREIGN PATENT DOCUMENTS

| EP | 0 865 176 A2 | 9/1998 |
|----|--------------|--------|
| WO | WO 96/26583 | 8/1996 |
| WO | WO 99/46883 | 9/1999 |

OTHER PUBLICATIONS

Koralek, et al., "Viterbi Decoder Synchronization and Ber Measurement Using Metric Values," University of Illinois, p. 354-363, Oct. 4, 1978. XP 000613183.
A.B. Carlson, "Communication Systems, Third Edition," MacGraw Hill Book Company, p. 536 and 552-554, 1986. XP-002407511.
Berrou et al., "Pseudo-syndrome Method for Supervising Viterbi Decoders at any Coding Rate," Electronics Letters, IEE, vol. 30, No. 13, p. 1036-1037, Jun. 23, 1994.
Yang et al., "An Investigation of and a Proposal for Handover Decision-Making in DVB-H," School of Engineering and Design, Brunel University, Uxbridge, Middlesex, United Kingdom, p. 1-5, Jun. 19, 2005. XP-002999199.

*Primary Examiner*—Dwayne D Bost
*Assistant Examiner*—Amancio Gonzalez
(74) *Attorney, Agent, or Firm*—McKenna Long & Aldridge LLP

(57) ABSTRACT

The present invention relates to a method for measuring radio channel quality in a radio communication system. In the method a modulated signal is received over a communication channel. The modulated signal has been modulated by using modulation parameters. A decoder decodes (305) the modulated signal and forms decoded data. The decoder creates (306) a decoder performance indicator (PS) that depends on the decoded data. Then a radio channel quality indicator (RCQI) is created, the radio channel quality indicator being essentially independent of the modulation parameters.

9 Claims, 4 Drawing Sheets

METHOD FOR MEASURING RADIO CHANNEL QUALITY AND RELATED EQUIPMENT

This application claims priority from the European patent application EP06291271 filed on 4 Aug. 2006, which is hereby incorporated by reference in its entirety.

FIELD OF THE INVENTION

The present invention relates to a method for measuring radio channel quality in a communication system. The invention also relates to a corresponding integrated circuit, demodulator and software program product.

BACKGROUND OF THE INVENTION

In many communication system architectures, such as in the context of digital video broadcast (DVB), the same content is broadcast on various radio channels from one or several transmitters. In radio communication systems a received signal can be switched to a different channel if a reception quality indicator or level drops below a certain threshold. This procedure is known as a handover.

The radio channel may vary over time, because a receiver is moving within the communication network or there is, for instance, a moving object passing the receiver. Therefore, the receiver may have to measure the quality of different radio channels to decide which channel offers sufficient quality of service and to perform a handover to that channel.

For time division multiplexed signals, the receiver can try to receive another frequency when no signal is transmitted on its current reception frequency.

The power consumption of such a receiver is an important issue. The receiver may be a battery powered device, such as a cellular phone or any type of mobile communication device. Therefore, the receiver has to evaluate a reception quality indicator for the current radio channel and the potential handover channel as fast as possible.

Different reception quality indicators exist that indicate a need for a handover. One such an indicator is the received radio frequency power or signal strength. The receiver makes a decision whether to perform a handover after having evaluated received signal strengths from different channels. The evaluation can be based on fixed thresholds or comparisons of different channels. Other examples of different reception quality indicators are: fixed received pilot signal power, relative received pilot signal power or received signal-to-noise ratio.

The major drawback when these indicators are employed is that the handover decisions are not very reliable for large band signals in multi path or fading channel environments. These channels experience frequency selective and time varying fading which alter the meaning of an absolute power for received pilot signals. Even a relative threshold between the different received channels cannot reliably prove that the receiver is able to demodulate the corresponding signal.

A publication entitled "Viterbi decoder synchronization and BER measurement using metric values" by Richard W. Koralek et al shows that the distribution of metric values in a Viterbi decoder depends on the $E_b/N_o$ of the communication link. A particular measure of the metric distribution is developed for synchronization and error rate purposes.

European patent application publication 0 865 176 A2 relates to a receiver of transmission wave in which a specific information data signal and its validity identification data signal are transmitted over the same frequency band.

SUMMARY OF THE INVENTION

One object of the invention is to limit the above identified deficiencies. More specifically, a more advanced method for measuring a radio channel quality has been invented.

According to a first aspect of the invention there is proposed a method for measuring radio channel quality in a radio communication system, wherein the method comprises the following steps:

receiving a modulated signal over a radio channel, said modulated signal being modulated according to modulation parameters;

decoding said modulated signal to form decoded data;

creating a decoder performance indicator depending on said decoded data, wherein the decoder performance indicator is based on a pseudo-syndrome value associated with decoding of error-corrected codes;

selecting a transfer function from a set of determined functions associated with the modulation parameters; and linearising the decoder performance indicator by using said selected function to form a radio channel quality indicator (RCQI), wherein said radio channel quality indicator is substantially independent of said modulation parameters.

The invention in accordance with an embodiment of the invention has the advantage that the radio channel quality can be reliably estimated since the effects of the modulation parameters are minimised. The radio quality indicator essentially depends on the decoder's ability of decoding the received data. The radio channel quality indicator gives a very fast estimation of the received signal quality since it only requires a few thousands of data bits to give a reliable value.

The invention may further comprise switching radio signal reception to another communication channel based on the radio channel quality indicator.

Further advantage is that switching a radio signal reception to another channel can be done quickly and efficiently using very little power in the receiving terminal.

Other aspects of the invention are recited in the claims appended hereto.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

The invention is applicable in connection with any systems employing trellis modulation. Trellis modulation, also known as trellis coded modulation, is a modulation scheme which allows highly efficient transmission of information over band-limited channels. The trellis modulated data can be demodulated by using a convolutional decoder, such as a Viterbi decoder. At the modulator end, the corresponding convolutional encoder is needed. Convolutional encoding is widely used, for instance in telecommunication and DVB systems.

In telecommunication, a convolutional code is a type of error-correcting code in which each m-bit information symbol to be encoded is transformed into an n-bit symbol, where m/n is the code rate (n>=m). The fundamental hardware unit for a convolutional encoding is a tapped shift register with L+1 stages, where L denotes the number of memory stages of a convolutional encoder.

Figure 1:
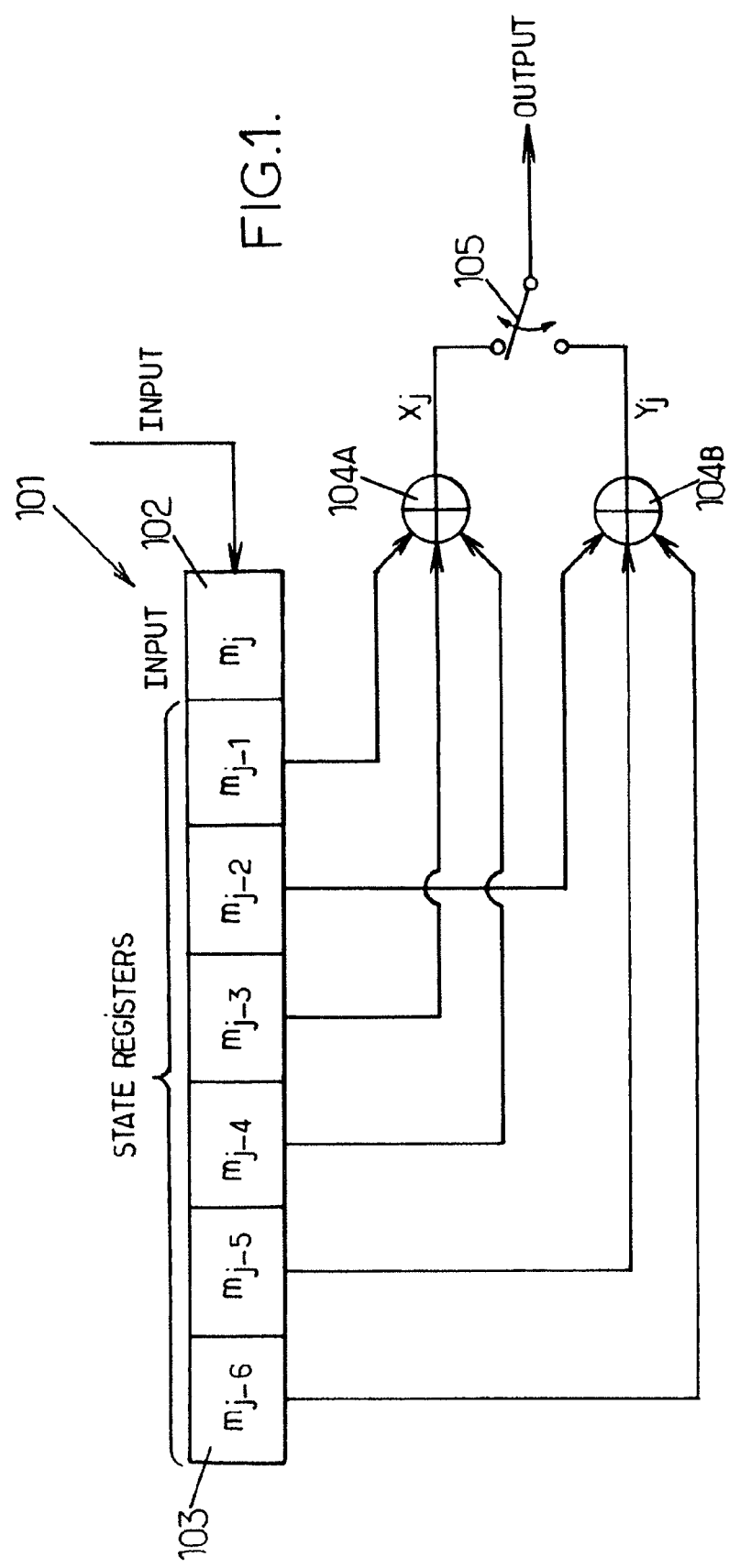
FIG. 1 is a block diagram of a prior art convolutional encoder applicable in embodiments of the present invention.

FIG. 1 depicts an example of a simple conventional convolutional encoder 101. The encoder comprises an input register 102 for input data and state registers 103. In this simplified example, the encoder comprises six state registers. The encoder 101 further comprises two modulo-2 adders 104A and 104B. In this example, the modulo-2 addition gives as an output 0, if the input bits have the same value and an output 1, if the input bits are different from one another. The encoded bits of different output branches x and y corresponding to the respective adders 104A and 104B are combined at the encoder output by a commutator switch 105 to interleave the encoded bits $x_j$ and $y_j$.

The encoder 101 of FIG. 1 operates in the following way. The state registers 103 are first initialised by certain bits, for instance zero bits. Then the first input bit is fed into the input register 102 and the encoder output bits are obtained after a modulo-2 addition and interleaving bits $x_j$ and $y_j$ from the two different addition output branches.

It is further possible to puncture the output bit sequence of the encoder 101 so that all encoded bits are not sent to the receiver for decoding. After the encoding, the output bits $x_j$ and $y_j$ from different output branches of the encoder 101 are interleaved so that every other bit is taken from a respective encoder 101 output branch to form a bit sequence $x_j, y_j, x_{j+1}, y_{j+1}, x_{j+2}, y_{j+2} \ldots$.

Now depending on the code scheme certain bits can be removed from the bit sequence to form a punctured bit sequence to be transmitted to the decoder. If in the transmitted bit sequence there still remain bits identified by the same indice, for instance bits $x_{j+1}, y_{j+1}$, then these bits are called unpunctured bits. Puncturing allows saving band-width since fewer bits need to be sent over the radio channel. The decoding performance is not degraded significantly if only a reasonable number of bits are punctured.

There exist three generic methods for decoding convolutional codes. At one extreme, the Viterbi algorithm executes maximum-likelihood decoding and achieves optimum performance, but requires extensive hardware storage and computation. At the other extreme, feedback decoding sacrifices performance for simplified hardware. Between these extremes, sequential decoding approaches optimum performance to a degree that depends on the decoder's complexity.

In the following exemplary embodiment, the Viterbi decoder is employed. Maximum likelihood decoders examine an entire received sequence and then they try to find a valid path that has the smallest Hamming distance from the received code. The Hamming distance between two vectors is defined to equal the number of different elements in the vectors. For instance, if X=(0 1 0) and Y=(0 0 1) then the Hamming distance is 2 because the second and third elements are different. Often the number of available paths is very large and therefore, Viterbi algorithm applies a maximum-likelihood principles to limit the surviving paths.

Viterbi decoding can be illustrated by a code trellis comprising several branches and a Viterbi decoder assigns to each branch of each surviving path a metric that equals its Hamming distance from the corresponding branch of the received code. Summing the branch metrics yields the cumulative path metric and the received code is finally decoded as the surviving path with the smallest path metric.

The Viterbi decoder can also be called forward-backward decoder. During the forward decoding algorithm, a cumulative path metric is computed for each potential output of the encoder. At the end of the forward phase, the lowest path metric is chosen as a starting point for the backward phase. During the backward phase, the path corresponding to the path metric having the lowest value is traced backward in the code trellis thereby decoding the input of the encoder.

Figure 2:
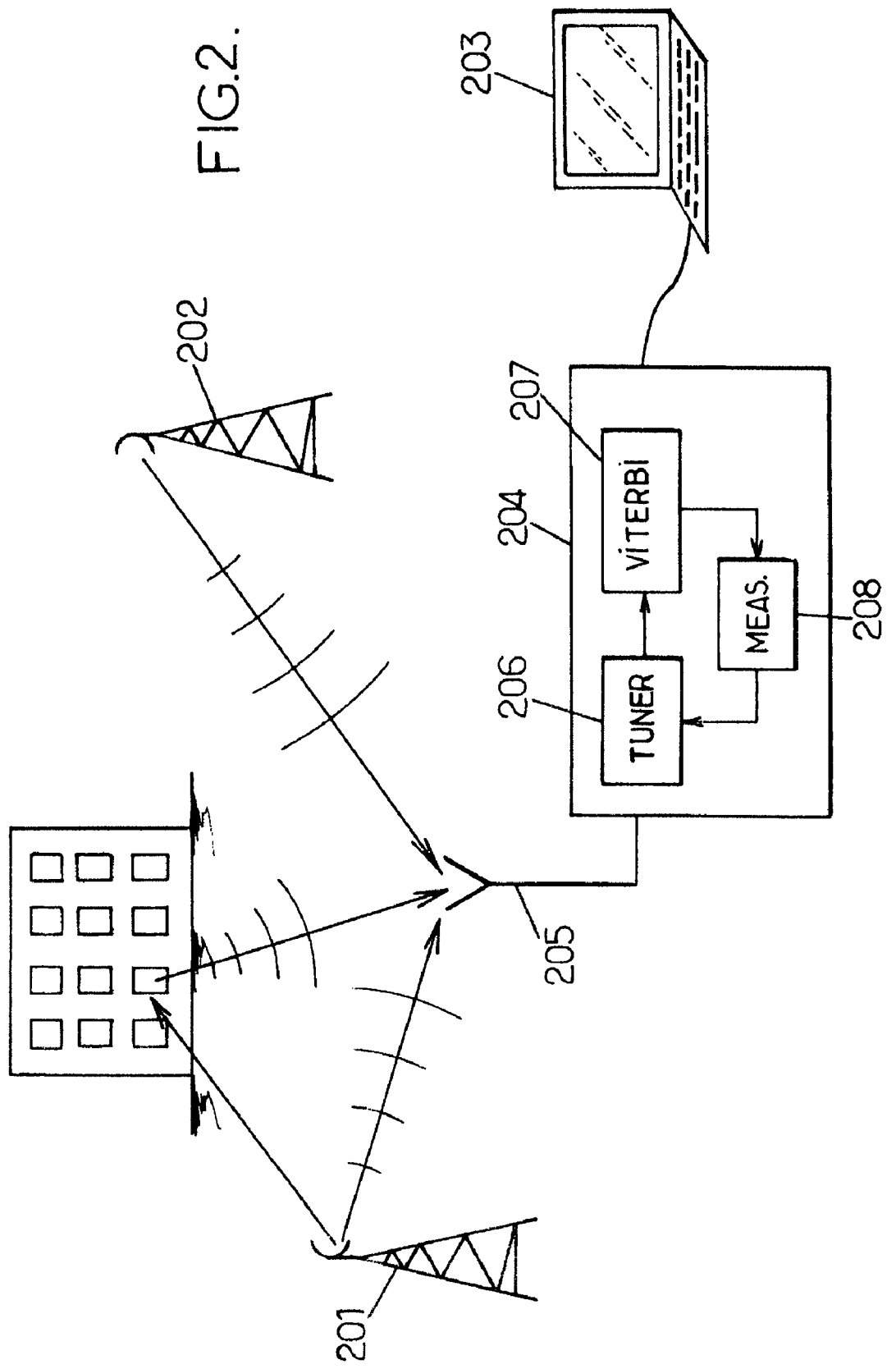
FIG. 2 is a schematic representation of a communication system where the embodiments of the invention can be applied.

Referring now to FIG. 2, a communication system is represented where the embodiments of the invention may be applied. In this system several transmitters 201 and 202 emit the same content, such as a digital television stream, toward a receiver 203. The data streams follow different radio channels depending on the environment and on the transmitter. For instance, the transmitters 201 and 202 use different frequencies and each transmission experiences echos.

The receiver 203 is, in this example, a portable computer 203 connected to a demodulator 204 by a universal serial bus (USB) link. The demodulator conventionally comprises an antenna 205 receiving the signals from the different radio channels and connected to a tuner 206.

The tuner 206 is adapted to select the radio channel and to process the corresponding data stream to provide a Viterbi decoder 207 with a processed data stream. In turn, the Viterbi decoder 207 feeds the computer 203 with decoded data.

The demodulator 204 further comprises a measuring module 208 arranged for measuring the quality of the radio channels and providing the tuner 206 with a corresponding radio channel quality indicator (RCQI) as will be described in more detail below.

Other conventional elements of the demodulator 204 are used but are not represented herein.

Figure 3:
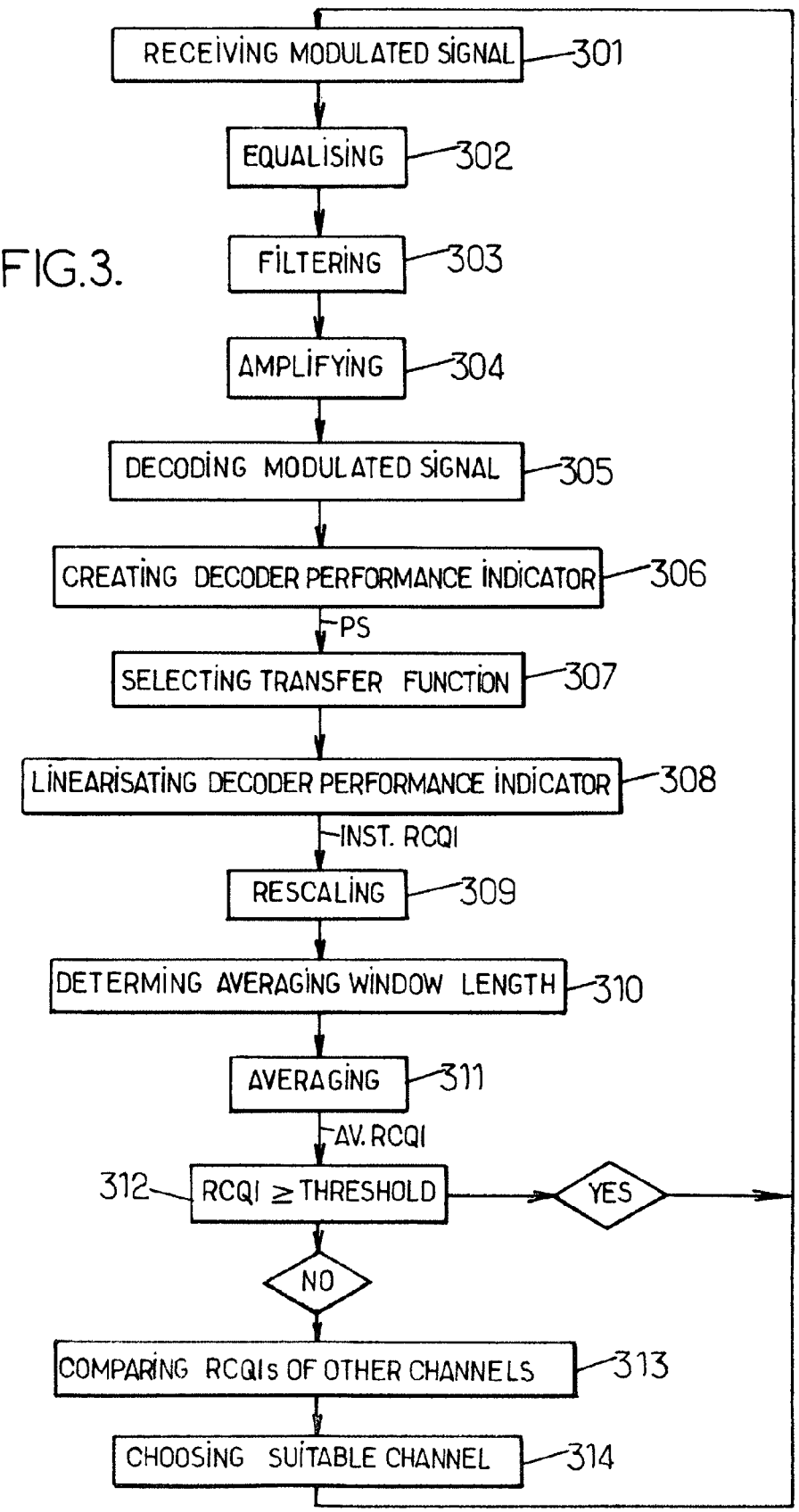
FIG. 3 is a flow chart illustrating a method in accordance with an embodiment of the present invention.

Referring now to FIG. 3, an embodiment of the invention will now be described in more detail. At a step 301 the demodulator 204 receives a modulated signal. The modulated signal has been modulated by using certain modulation parameters. Examples of modulation parameters are, for instance modulation scheme and coding rate.

At a step 302 the received signal is equalised. During equalisation signal distortions suffered during the signal propagation from the transmitter to the receiver are compensated.

Next at a step 303 the equalised signal is filtered so that unwanted frequencies are filtered out and then at a step 304 the signal is amplified so that it is better suitable for decoding.

Steps 301 to 304 are performed in a conventional manner by the tuner 206 and other conventional components of the demodulator 204 and will not be described in further detail herein.

At a step 305, the modulated signal is decoded, in this case by the decoder 207 by using a forward-backward decoding scheme as described with reference to FIG. 1.

During the forward phase of the decoding, at a step 306 a decoder performance indicator is computed for indicating the decoder efficiency. In the described example, the decoder performance indicator is based on a so called pseudo-syndrome (PS) value. This pseudo-syndrome is a soft value taking values between 0 and 1 and it is representative of the likelihood of the decoder input samples as symbols compatible with convolutional generation. Compatibility with the convolutional generation in this context means that the received bits are compatible with the consecutive states of the encoder.

The pseudo-syndrome can be calculated in several ways. One way of calculating the pseudo-syndrome was disclosed in (<<Pseudo-syndrome method for supervising Viterbi decoders at any coding rate>>, C. Berrou and C. Douillard, IEEE Electronics Letters, 23 Jun. 1994, vol 30 n° 13.

In this example, the pseudo-syndrome is computed by taking from the encoded data stream, different output branches unpunctured bits $x_j$ and $y_j$ corresponding to the same register state and calculating in the decoding trellis how many times unpunctured bits lead in different paths in the decoding trellis. This number is then compared to the total number of unpunctured bits to deliver the pseudo-syndrome value, which is in this example the decoder performance indicator.

The obtained decoder performance indicator depends on the modulation parameters, and is not as such a good indicator of the actual radio channel quality. Furthermore, the decoder performance indicator represents an instantaneous value and if the radio channel varies over time, it does not give very reliable indication of the decoder performance.

The decoder performance indicator may be represented, for instance relatively to the bit error rate (BER) of the received signal.

Figure 4:
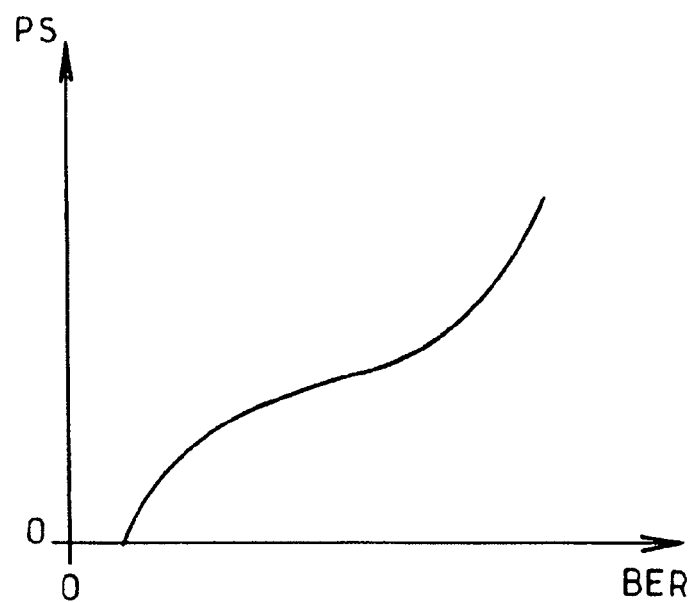
FIG. 4 is a diagram depicting in an example the relationship of the decoder performance indicator and received signal quality.

FIG. 4 depicts one example of how the decoder performance indicator could be represented with reference to a received signal quality, such as a BER value.

In the embodiment described, the creation of the decoder performance indicator is performed directly by the decoder 207.

Next the radio channel quality indicator (RCQI) is created based on the decoder performance indicator.

The creating comprises selecting a transfer function at a step 307 from a set of determined transfer functions. These functions are determined based on the modulation parameters, one particular function being associated with each set of modulation parameters.

The creating further comprises, at a step 308 linearsing the performance indicator by use of the transfer function corresponding to the current modulation parameters. As a result, an instantaneous RCQI is created which is essentially independent of the modulation parameters and represents only the radio channel quality.

For this purpose, for instance linear functions can be used. For each modulation parameter, a set of parameters (a, b) can be defined. The parameter set (a, b) is obtained through simulations using all possible parameter values. Then the RCQI can be obtained, for example, from the following formula: RCQI=a×PS+b.

The instantaneous RCQI is then rescaled at a step 309 to be spread over a convenient scale, for instance between 0 and 100. The RCQI value obtained at that stage represents an instantaneous value as it is based on the decoder performance indicator, which also represents an instantaneous value.

To obtain an average RCQI value, several samples of the instantaneous RCQIs are averaged in an averaging window. At a step 310, the length of the averaging window is determined. The length of the averaging window advantageously depends on the radio channel characteristics. For instance, if the receiver is experiencing a rapidly changing radio channel, then the length of the averaging window is increased, whereas when the radio channel quality is essentially stable for a certain period, the length of the window can be shorter.

Then at a step 311 the RCQI samples representing an instantaneous channel quality are averaged to form an RCQI value indicative of the average radio channel quality. Thus, the purpose of the averaging is to make the RCQI value independent of the spurious changes on the radio channel. For instance effects of a passing car on a detected radio channel quality are minimised by averaging the instantaneous RCQI values.

Figure 5:
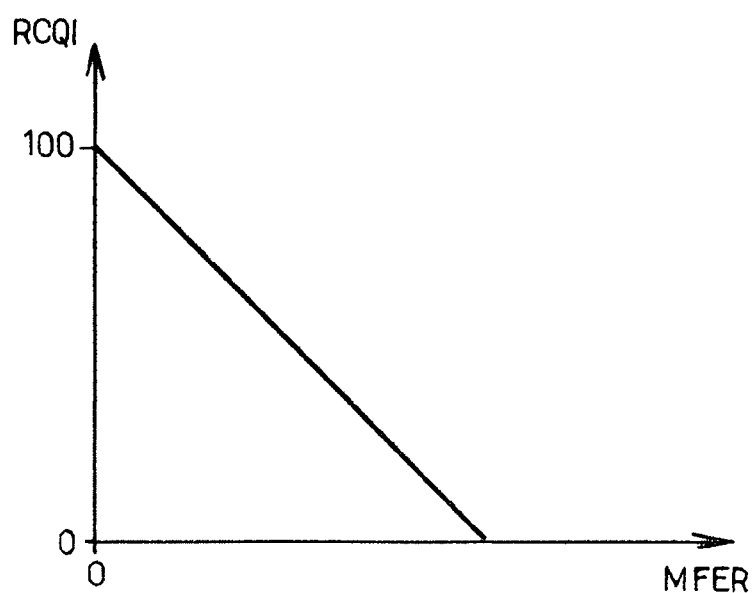
FIG. 5 is a diagram depicting in an example the relationship of the radio channel quality indicator and received signal quality.

FIG. 5 shows one representation of the RCQI with reference to the received signal quality. In this case a unit representing the received signal quality is a multi protocol encapsulation frame error rate (MFER). Due to the computation method used for the RCQI, this indicator depends linearly on the signal quality and can be represented by a line as shown in FIG. 5, high RCQI values corresponding to high channel quality.

In accordance with an embodiment of the invention, the RCQI depends merely on the ability of the receiver to decode the received data. Based on the RCQI value representing the average channel quality, it can be reliably decided if the decoder can decode the received data independently of the modulation parameters and of the reception impairment types.

In accordance with the present invention the obtained RCQI is a representation of the radio channel quality and is independent of modulation parameters such as modulation protocols, frequencies or the like. As the RCQIs are expressed independently of their respective modulation parameters, it is possible to directly compare RCQIs of different radio channels, i.e. without requiring conversion charts or the like. Thus, the obtained RCQI allows quickly and reliably determining the quality of the radio channel regardless of the modulation parameters.

In the example, the RCQI value is used by the tuner 206, for instance in handover procedures to decide whether the received radio signal should be switched to another channel. For this purpose the receiver scans potential other channels and estimates their RCQIs.

At a step 312 the RCQI representing an average signal quality of the current communication channel is compared to a fixed threshold t. If the RCQI equals or is greater than the threshold t, then it is concluded that the quality of the current channel is sufficient for the communication and there is no need to perform a handover. The radio channel quality estimation procedure then starts again to update the value of the RCQI.

If on the other hand the RCQI is below the threshold t, then it is concluded that the radio channel quality of the current channel is not good enough. The RCQI of the current channel is then compared with the RCQI values of the other channels at step 313. By comparing the RCQIs of different channels, the receiver reliably decides which one will provide the best radio channel quality. If any of the RCQI values of the other channels is higher than the RCQI value of the current channel, then at a step 314 a handover is performed advantageously to the channel having the highest RCQI value. After this the radio channel quality estimation starts again.

Above one embodiment of the invention was disclosed, but other embodiments are also possible. For instance, the encoder can have any number of state registers 103 and the invention is equally independent of the number of modulo-2 adders 104.

In some embodiments of the invention one or all of the following are not needed: equalisation, filtering or/and amplifying. Furthermore, they may be performed in a different order than described above.

The RCQI or other signal quality information depending on the RCQI may also be displayed to the user of the receiver on a display of the receiver, such as the computer 203.

The invention also relates to the corresponding computer program product that is capable of implementing the method in accordance with the embodiments of the invention when loaded and run on computer means of the system.

The invention equally relates to an integrated circuit that is arranged to perform any of the method steps in accordance with the embodiments of the invention.

Furthermore, the invention relates to a corresponding demodulator that is arranged to perform any of the method steps in accordance with the embodiments of the invention. The demodulator can be implemented, for instance as an integrated circuit.

Even if the embodiments of the invention were described above in the context of DVB, it is appreciated that the invention is equally applicable to other communication systems as well.

The invention claimed is:

1. A method for measuring radio channel quality in a radio communication system, wherein the method comprises the following steps:
   receiving a modulated signal over a radio channel, said modulated signal being modulated according to modulation parameters;
   decoding said modulated signal to form decoded data;
   creating a decoder performance indicator depending on said decoded data, wherein the decoder performance indicator is based on a pseudo-syndrome value associated with decoding of error-corrected codes;
   selecting a transfer function from a set of determined functions associated with the modulation parameters; and
   linearizing the decoder performance indicator by using said selected function to form a radio channel quality indicator (RCQI), wherein said radio channel quality indicator is substantially independent of said modulation parameters.

2. The method according to claim 1, wherein said decoding step comprises convolutional decoding of a punctured bit sequence.

3. The method according to claim 1, wherein said creating said decoder performance indicator comprises calculating how many times unpunctured bits lead in different paths in a decoding trellis and comparing the number so obtained to the total number of unpunctured bits.

4. The method according to claim 1, wherein creating said radio channel quality indicator comprises resealing said radio channel quality indicator.

5. The method according to claim 1, wherein said creating said radio channel quality indicator comprises determining length of an averaging window based on radio channel characteristics and averaging several radio channel quality indicators in said averaging window.

6. The method according to claim 1, further comprising displaying said radio channel quality indicator on a display of a user terminal.

7. The method according to claim 1, wherein said method further comprises switching radio signal reception between radio channels based on said radio channel quality indicator.

8. An integrated circuit arranged for measuring radio channel quality in a radio communication system, wherein the integrated circuit is comprises means for:
   receiving a modulated signal over a radio channel, said modulated signal being modulated according to modulation parameters;
   decoding said modulated signal to form decoded data;
   creating a decoder performance indicator depending on said decoded data, wherein the decoder performance indicator is based on a pseudo-syndrome value associated with decoding of error-corrected codes;
   selecting a transfer function from a set of determined functions associated with the modulation parameters; and
   linearizing the decoder performance indicator by using said selected function to form a radio channel quality indicator (RCQI), wherein said radio channel quality indicator is substantially independent of said modulation parameters.

9. A demodulator arranged for measuring radio channel quality in a radio communication system, wherein the demodulator comprises means for:
   receiving a modulated signal over a radio channel, said modulated signal being modulated according to modulation parameters;
   decoding said modulated signal to form decoded data;
   creating a decoder performance indicator depending on said decoded data, wherein the decoder performance indicator is based on a pseudo-syndrome value associated with decoding of error-corrected codes;
   selecting a transfer function from a set of determined functions associated with the modulation parameters; and
   linearizing the decoder performance indicator by using said selected function to form a radio channel quality indicator (RCQI), wherein said radio channel quality indicator is substantially independent of said modulation parameters.

* * * * *